(12) United States Patent
Lodholz et al.

(10) Patent No.: US 7,172,208 B2
(45) Date of Patent: Feb. 6, 2007

(54) AIRBAG HOUSING ON A MOTOR VEHICLE STEERING WHEEL WITH A GAS GENERATOR AS VIBRATION-ABSORBING MASS

(75) Inventors: Roland Lodholz, Ebringen (DE); Friedrich Back, Müllheim (DE)

(73) Assignee: Carl Freudenberg KG (DE)

( * ) Notice: Subject to any disclaimer, the term of this patent is extended or adjusted under 35 U.S.C. 154(b) by 278 days.

(21) Appl. No.: 10/791,654

(22) Filed: Mar. 2, 2004

(65) Prior Publication Data

US 2004/0232667 A1    Nov. 25, 2004

(30) Foreign Application Priority Data

Mar. 15, 2003    (DE)    ................. 103 11 465

(51) Int. Cl.
*B60G 21/16*    (2006.01)
(52) U.S. Cl. .................... 280/728.2; 280/731
(58) Field of Classification Search ............ 280/728.1, 280/728.2, 731
See application file for complete search history.

(56) References Cited

U.S. PATENT DOCUMENTS

| 6,361,065 B1* | 3/2002 | Frisch | 280/728.2 |
|---|---|---|---|
| 6,435,540 B1* | 8/2002 | Durre | 280/728.2 |
| 6,783,149 B2* | 8/2004 | Lovell et al. | 280/728.2 |
| 2003/0038459 A1* | 2/2003 | Leibach et al. | 280/728.2 |
| 2003/0038462 A1* | 2/2003 | Leibach et al. | 280/731 |
| 2003/0116948 A1* | 6/2003 | Back et al. | 280/731 |

FOREIGN PATENT DOCUMENTS

| DE | 299 02 033 U1 | 2/1999 |
|---|---|---|
| DE | 199 55 426 | 6/2001 |
| DE | 101 31 830 | 1/2003 |

\* cited by examiner

*Primary Examiner*—Eric Culbreth
(74) *Attorney, Agent, or Firm*—Harness, Dickey & Pierce, P.L.C.

(57) ABSTRACT

According to the present disclosure, an insert for an airbag housing on a motor vehicle steering wheel is provided that is configured to couple a gas generator thereto for use as a vibration-absorbing mass for damping steering wheel vibrations. The insert includes an annular rubber membrane having an edge that faces the airbag housing and is provided with a surrounding metallic holding sheet for connection to the airbag housing. The insert further includes another edge that is oriented toward the gas generator. The rubber membrane is provided with a receiving element for frictional engagement with the gas generator.

12 Claims, 3 Drawing Sheets

AIRBAG HOUSING ON A MOTOR VEHICLE STEERING WHEEL WITH A GAS GENERATOR AS VIBRATION-ABSORBING MASS

CROSS-REFERENCE TO RELATED APPLICATIONS

This application claims the benefit of German Patent Application 103 11 465.3, filed Mar. 15, 2003. The disclosure of the above application is incorporated herein by reference.

FIELD OF THE INVENTION

The present invention relates to an airbag housing on a motor vehicle steering wheel with a gas generator used as vibration-absorbing mass to dampen the steering wheel vibrations. The gas generator is connected with the airbag housing in a gas-tight manner by means of an insert with an annular rubber membrane that extends along the length of the steering wheel axis.

BACKGROUND OF THE INVENTION

Motor vehicles, during movement or when they are standing still with the motor running, are subject to vibrations that can be transmitted to the steering column, and from there, to the steering wheel. Any writing or marking on the steering wheel can then become illegible. To counteract such steering wheel vibrations and to improve riding comfort, vibration absorbers are provided either directly on the steering column or in the airbag housing on the steering wheel. The gas generator, among other things, is also used as vibration-absorbing mass for the damping of steering wheel vibrations. A problem that needs to be overcome in such cases involves the connection between the gas generator and the airbag housing which in turn is connected with the steering column. A number of proposals have been made to solve this problem.

For example, DE 199 55 427 A1 uses a gas-tight insert that is connected with an annular rubber membrane that extends along the steering wheel axis. The rubber membrane is provided with connecting parts that connect it with corresponding fastening flanges on the gas generator or airbag housing. This kind of connection, however, assumes that appropriate connecting sites are present on the gas generator. Other known connections between the rubber membrane and the gas generator are designed similarly and are based on the same principle.

SUMMARY OF THE INVENTION

The object of the invention is to provide a simple design connection design between a gas generator, used as a vibration-absorbing mass, and the airbag housing. The connection should be rather simple and should permit rapid and low-cost installation.

For an airbag housing, the above objective is reached by providing a rubber membrane that is, at its edge facing the airbag housing, provided with a surrounding metallic holding sheet for connection to the airbag housing. At an edge that faces the gas generator, the rubber membrane is provided with a receiving element for frictionally or snugly receiving the gas generator. Such a design makes it possible for the gas generator to be fabricated as a container with an externally smooth cylindrical wall without additional connection elements. The fabrication of the insert is relatively simple because the receiving element must only be adapted to the outer dimensions of the gas generator. In its simplest embodiment, the receiving element can consist of a ring encircling the gas generator. This ring is connected with the gas generator by pressing or shrinking it onto the gas generator. Note in this regard that, rather than on the outer wall of the gas generator itself, the ring can also be placed on the outer wall of a filter tube or metallic diffuser sheet surrounding the gas generator.

Pursuing the inventive idea further, the ring can, at its down-facing edge, be provided with an inward oriented border. This border ensures a snug hold when the gas generator is inserted into the ring. Further, very reliable fastening of the gas generator in the receiving ring is achieved when the gas generator is held in the ring both snugly and by friction.

It is advantageous if the ring and the rubber membrane are of about the same height. This design makes it possible to push the gas generator far into the ring which results in good support of the gas generator in terms of its fastening, and also in terms of its efficacy as a vibration-absorbing mass.

The connection of the rubber membrane to the metallic holding sheet and/or the receiving element is preferably obtained by vulcanization. In this case, the insert consist of three elements: the rubber membrane, the metallic holding sheet, and the receiving element. The metallic holding sheet in turn can be provided with holes for fastening screws. In this case, installation of the gas generator in the airbag housing is very simple. That is, the gas generator is inserted into the receiving element and optionally shrunk or pressed in. The gas generator is then held in the insert and, at appropriate sites and together with the metallic holding sheet, is screwed onto the airbag housing. For total gas-tight closure between the airbag housing and the insert, during vulcanization, the rubber membrane is pulled slightly over the outer surface of the metallic holding sheet so that when the sheet is screwed onto the flange of the airbag housing, the rubber membrane is used for sealing purposes and, at the same time, can serve as a rubberized vibration restriction for the vibration-absorbing mass (gas generator).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
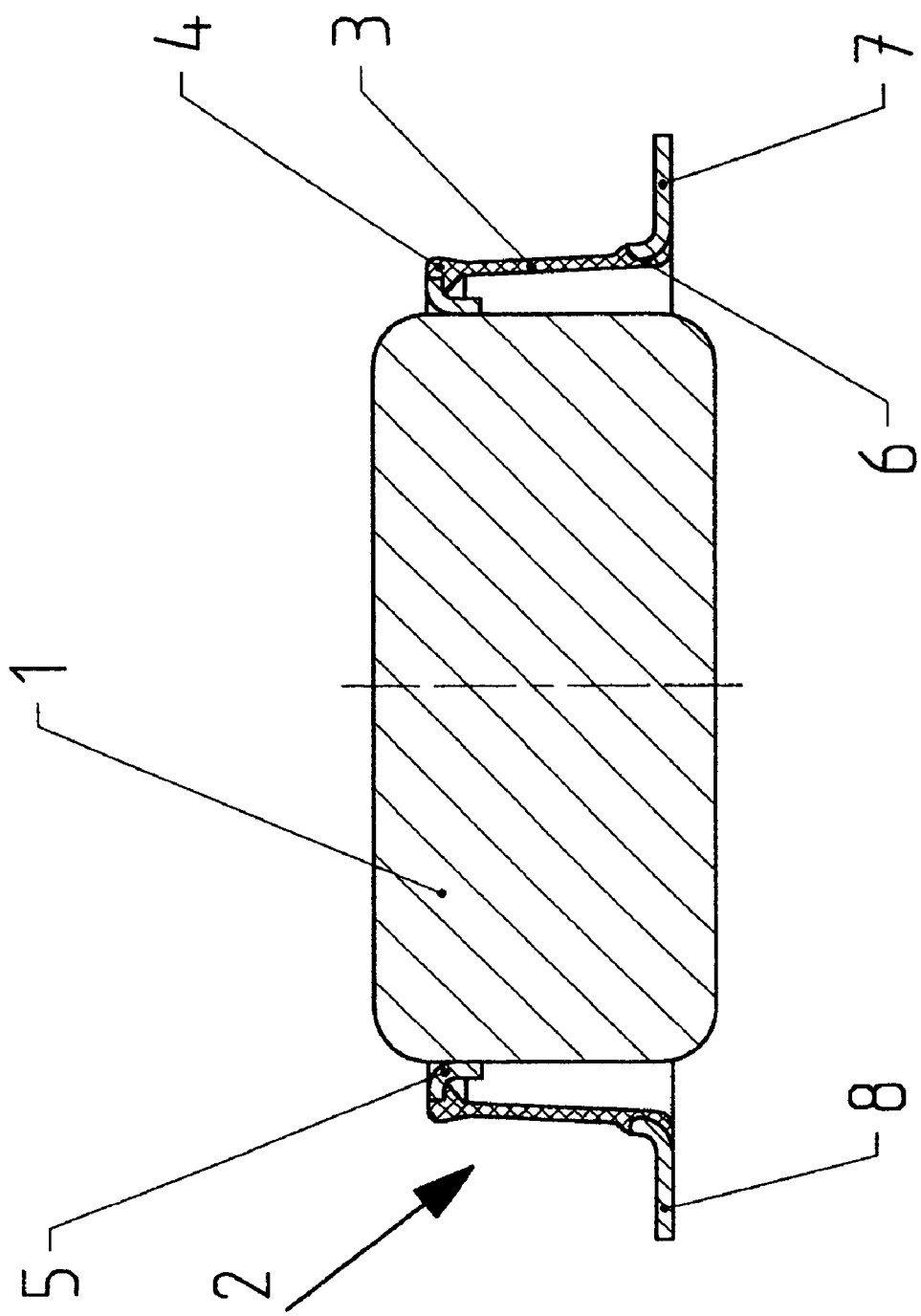
FIG. 1 is a schematic representation in cross-section of a gas generator held by an insert according to a principle of the present invention.

FIG. 1 shows a longitudinal cross-section of a gas generator 1 resting in an insert 2. The insert 2 consists of a conical rubber membrane 3 which, at an edge 4 directed toward the gas generator 1, is provided with a ring intended as a receiving element 5 for the gas generator 1. At an edge 6 that faces the airbag housing, not shown in greater detail, the rubber membrane is provided with a surrounding metallic holding sheet 7 for connection to the airbag housing. The ring or the receiving element 5 is pressed onto the gas generator so that a reliable frictional connection is created between the two parts. Alternatively, ring or receiving element 5 is shrunk onto the gas generator to create the frictional connection. The edge 6 of the rubber membrane 3 protrudes slightly over the outer surface 8 of metallic holding sheet 7 so that when the sheet 7 is screwed onto a corresponding flange of the airbag housing, the edge of the rubber membrane can be used for sealing purposes and, at the same time, can act as vibration restriction for the vibration-absorbing mass.

Figure 2:
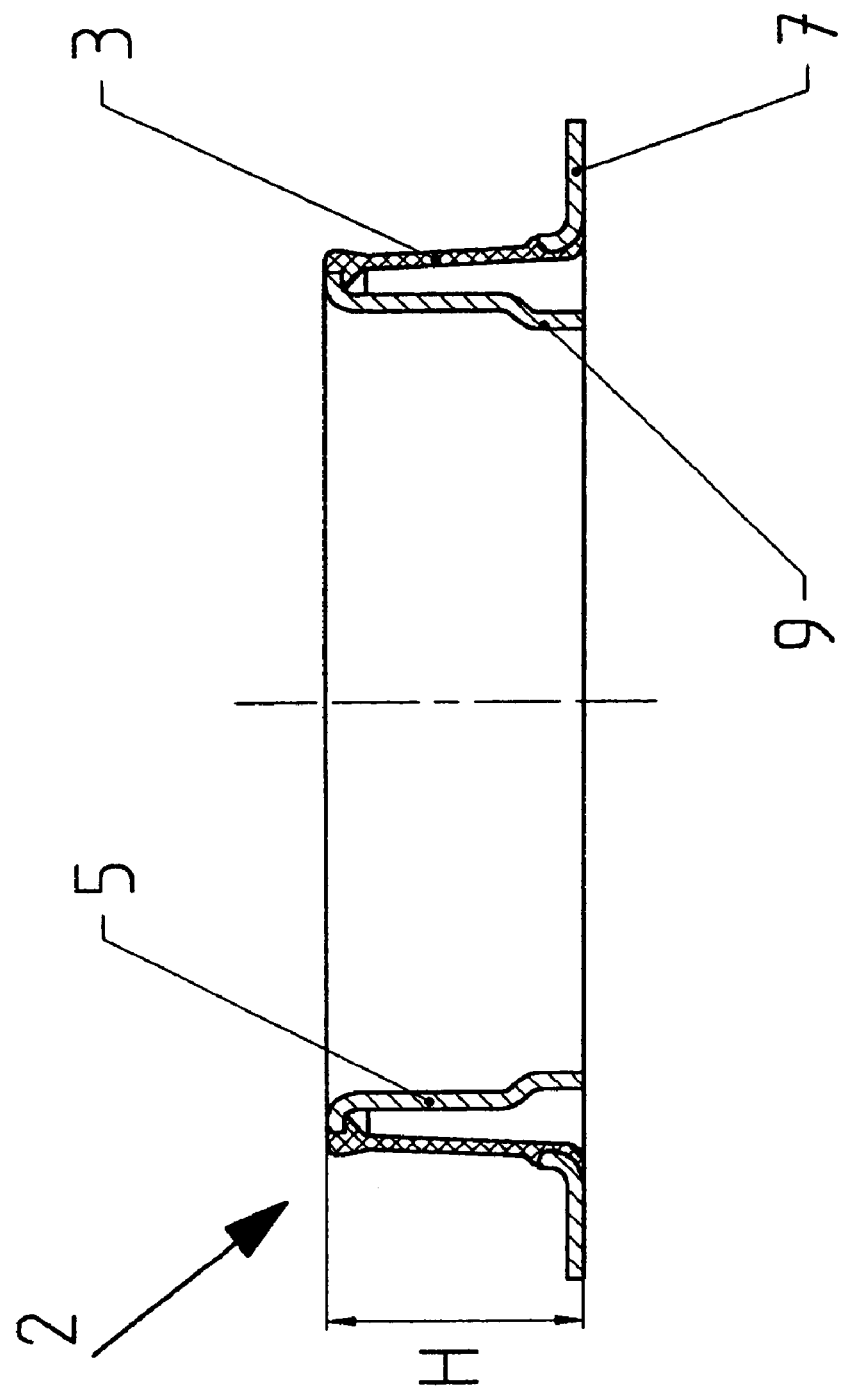
FIG. 2 shows another embodiment of the insert, also in cross-section, according to a principle of the present invention.

FIG. 2 shows an insert 2, also in longitudinal cross-section, in which the ring 5 has a tubular shape to further improve the reception of gas generator 1. Moreover, on its downward-oriented edge, the ring 5 is provided with a border 9 that serves as a stop and also as a snug support for the gas generator 1 to be inserted into the ring 5. In this embodiment of the invention, the rubber membrane 3 and the ring 5 including the border 9 are of approximately the same height. This results in very good support of the gas generator 1 in the receiving element 5. At the same time, the arrangement of the gas generator in the rubber membrane 3 provides a very advantageous arrangement of the vibration-absorbing mass. The insert 2 is screwed onto the airbag housing, not shown in greater detail, together with the metallic holding sheet 7. The connection of the rubber membrane 3 with the metallic holding sheet 7 and the receiving element 5 is obtained by vulcanization, as in the embodiment of the invention shown in FIG. 1, described above.

Figure 3:
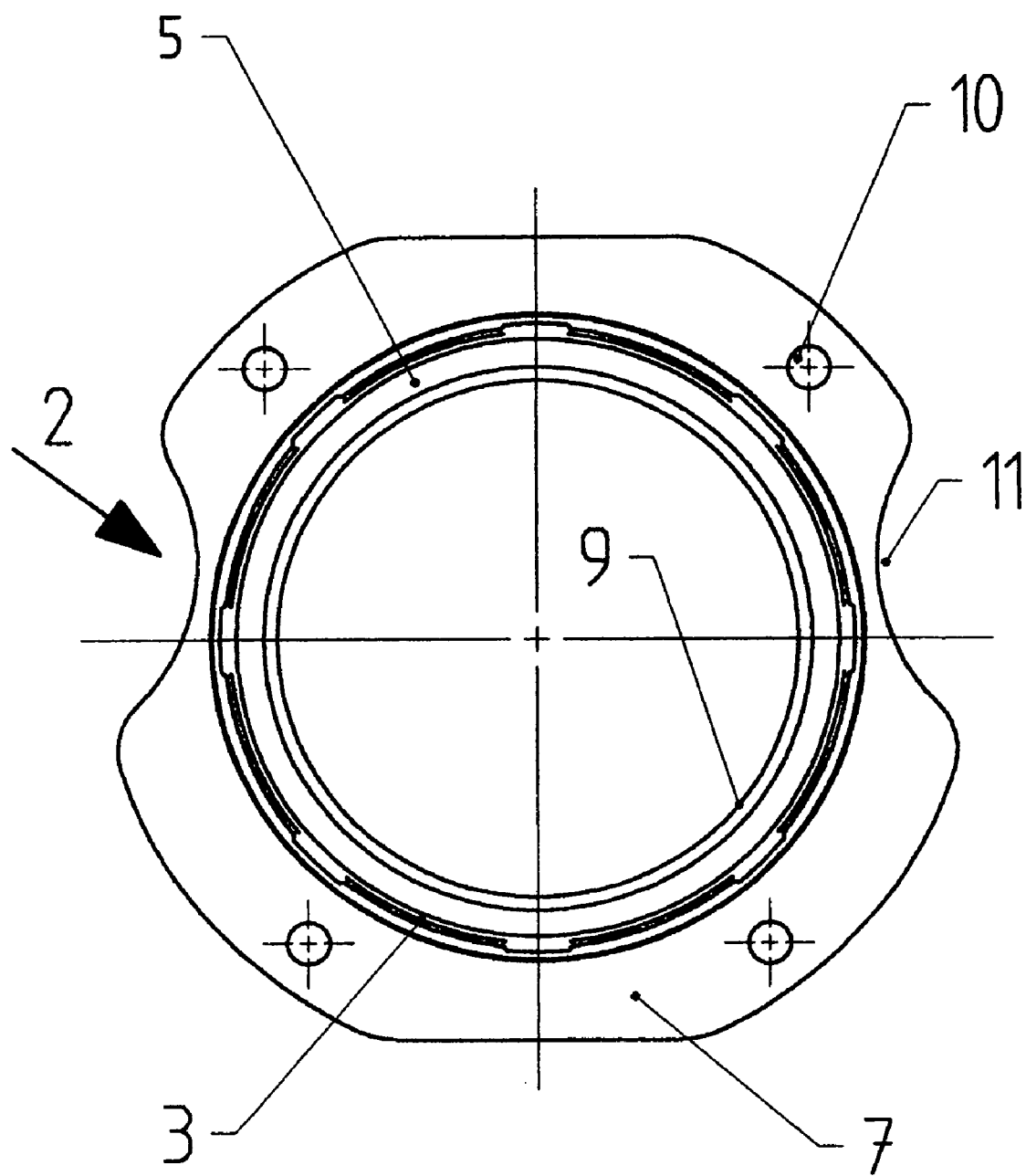
FIG. 3 is a top view of the insert of FIG. 2.

FIG. 3 shows a top view of the insert 2 depicted in FIG. 2. Here, holes 10 for the fastening screws, whereby the metallic holding sheet 7 is connected with a corresponding flange of the airbag housing, can be seen. The metallic holding sheet 7 surrounds the rubber membrane 3. Indentations or sections 11 are related to design features of the airbag housing. It is important, however, that when the metallic holding sheet is screwed onto the fastening flange of the airbag housing, a gas-tight connection is produced so that the triggering of the gas generator does not cause an undesirable outward gas release.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An insert for an airbag housing on a motor vehicle steering wheel configured to couple a gas generator thereto for use as a vibration-absorbing mass for damping steering wheel vibrations, said insert comprising:
    an annular rubber membrane extending along the length of a steering wheel axis including an edge that faces the airbag housing and provided with a surrounding metallic holding sheet for connection to the airbag housing and another edge that is oriented toward the gas generator, wherein the rubber membrane is provided with a receiving element for frictional engagement with the gas generator, the receiving element having a length generally equal to the length of the annular rubber membrane.

2. The insert according to claim 1, wherein the receiving element includes a ring encircling the gas generator.

3. The insert according to claim 2, wherein at a downward-oriented edge, the ring is provided with an inward-oriented border.

4. The insert according to claim 1, wherein the metallic holding sheet is provided with holes for fastening screws.

5. The insert according to claim 1, wherein the rubber membrane is vulcanized onto at least one of the metallic holding sheet and the receiving element.

6. The insert according to claim 1, wherein the rubber membrane protrudes slightly over an outer surface of the metallic holding sheet and is used for one of sealing purposes and as a vibration restriction.

7. An insert configured to couple a gas generator to an airbag housing, said insert comprising:
    a member including a first edge that faces the housing and a second edge that faces the gas generator, the first edge provided with a holding sheet that connects the insert to the housing and the second edge provided with a ring that encircles the gas generator;
    wherein the ring extends a length generally equal to a length of the insert and is connected to the gas generator by one of pressing and shrinking the ring onto an outer wall of the gas generator to hold the gas generator by friction.

8. The insert according to claim 7, wherein the ring includes an inward oriented border to hold the gas generator by friction.

9. The insert according to claim 7, wherein the holding sheet is comprised of metal and includes holes for fastening screws.

10. The insert according to claim 7, wherein the insert comprises a conical rubber membrane.

11. The insert according to claim 7, wherein the ring comprises a tubular shape.

12. The insert according to claim 7, wherein the insert is connected to the holding sheet and the ring by vulcanization.

* * * * *